United States Patent [19]
Menashe

[11] Patent Number: 5,586,937
[45] Date of Patent: Dec. 24, 1996

[54] INTERACTIVE, COMPUTERISED GAMING SYSTEM WITH REMOTE TERMINALS

[76] Inventor: Julian Menashe, 54 Copley Park, London SW16 3DB, United Kingdom

[21] Appl. No.: 252,538

[22] Filed: May 19, 1994

[30] Foreign Application Priority Data

May 19, 1993 [ZA] South Africa ............... 93/3483

[51] Int. Cl.$^6$ ................................................ A63F 9/22
[52] U.S. Cl. ........................... 463/41; 463/29; 463/16
[58] Field of Search ........................ 273/138 A, 439, 273/269; 463/16, 29, 41

[56] References Cited

U.S. PATENT DOCUMENTS

| | | |
|---|---|---|
| 4,494,197 | 1/1985 | Troy et al. |
| 4,856,787 | 8/1989 | Itkis ............................ 273/269 |
| 4,948,138 | 8/1990 | Pease et al. ............. 273/138 A |
| 5,324,035 | 6/1994 | Morris et al. ............ 273/138 A |
| 5,326,104 | 7/1994 | Pease et al. ............. 273/138 A |
| 5,351,970 | 10/1994 | Fioretti ........................ 273/439 |

FOREIGN PATENT DOCUMENTS

| | | |
|---|---|---|
| 0542664 | 5/1993 | European Pat. Off. . |
| 2147773 | 5/1985 | United Kingdom . |
| 2151054 | 7/1985 | United Kingdom . |

Primary Examiner—Angela D. Sykes
Assistant Examiner—Eric F. Winakur
Attorney, Agent, or Firm—Young & Thompson

[57] ABSTRACT

The gaming system includes a host computer, a plurality of general purpose terminal computers forming player stations remote from the host, means for providing communication between each of the terminals and the host. Each terminal has a program for generating screen graphics and sound locally in response to control data packets generated by and received from the host. The host generates random numbers for a game being played on a connected terminal within preset criteria for that game in response to data packets received from the terminal. The data packets are of variable length between 1 and 80 bytes. The host sequentially stores the minimum significant information for replaying a game, auditing and security, such as accounting data of each player at the start of each game, random numbers generated by the host, responses received from a player, and whether a game was completed. Play is substantially real-time, because only minimal data is transmitted with functions requiring large amounts of data, such as screen graphics being generated locally. The statuses of host and terminal are restored automatically on re-establishing communication following an interruption to ensure fairness to players and prevent them defeating the outcome of a game.

17 Claims, 1 Drawing Sheet

INTERACTIVE, COMPUTERISED GAMING SYSTEM WITH REMOTE TERMINALS

FIELD OF THE INVENTION

This invention relates to an interactive, real time, realistic "home" computer gaming system using general purpose computers. The system comprises a central or host computer, a plurality of terminal computers forming player stations remote from the host, communicating means for connecting each of the terminals to the host, and program means for operating the computers and the communication between the terminals and host. Aspects of the invention concern auditing and security to ensure fairness for players and prevent players defeating the outcome of a game; fast, efficient communication to enable reliable, low cost, real time, realistic operation; accounting; and enabling players to play a variety of games.

BACKGROUND OF THE INVENTION

Many computerised gaming systems have been proposed having a host and terminals, which may be remote or local, with different operating systems depending largely on the game being played. The broad general groupings are discussed below as a survey of the art.

One group is centred on horse betting using home or agency terminals. Home terminal systems usually use a teletext or teletext type interface to display betting and account data on the terminal and to input bets to the host often coupled with a control for television viewing. Data may also be transmitted through a telephone system. Betting inputs are simple, such a horse or horse couple number. Patents disclosing typical systems are JP 1-269157 to JP 1-269164. Agency terminals are broadly similar, but have betting slip reading and/or printing facilities. Patents disclosing typical systems are FR 2,368,092, GB 2,269,926, 2,262,635, 2,075,369, 2,028,558, 1,491,780. Such systems are not interactive; are not real time because of the delays in transmitting large volumes of data; have limited auditing and/or playback capabilities because of the large amount of data that has to be stored; and are not realistic in that limited information only is displayed on the terminal screens. Auditing and data storage is problematical and generally, if there is a fault, then a bet is voided. Such systems are restricted to one form of gaming only and use dedicated or special equipment; as such are unsuitable for general gaming purposes.

A second group, typified by U.S. Pat. No. 4,922,522 and PCT applications WO 92/10806 and WO 89/05490, are computer based lottery ticket distributing systems. Apart from providing systems for the practical demands of participants, such as selection verification, ticket reading, etc., these systems are primarily concerned with data security and storage. They are not interactive, real time, adaptable to other games, and of necessity use dedicated equipment.

A third group, eg. U.S. Pat. Nos. 3,909,002, 4,339,798 and 4,467,424 concern computerised gaming systems that enable players to participate in casino games, like craps, roulette and keno, at terminals rather than at the tables. With these systems a game actually being played in a casino is displayed to a remote player via a television or dedicated display panel. Players place their bets via panels on the terminals. The outcome of the game and account balances for each player are stored in a central computer and displayed on each player's panel. The system and games being played are not interactive and a croupier enters game details as it is being played. These systems mimic actual games, are not interactive, require dedicated terminals, need large volumes of data to be stored and transmitted and, because of data transmission problems, are limited to local area use. Such systems are suitable for use in, and are believed to have been used in, hotel casinos.

A forth group, eg. U.S. Pat. No. 4,760,527 and 4,926,367, provide computerised interactive wagering, specifically playing poker, among a plurality of players. The system uses a central computer and dedicated terminals. Large volumes of data are transmitted between machines to display games and outcomes, so that the terminals are confined to a local area. The games are interactive as among players, but not as between each player and the central computer. The central computer does not simulate a game.

Finally there are so called "television (or video) game" systems which attempt to provide real time, interactive gaming. JP 2-295,338 discloses one such system having a host or central computer transmit screen display data to dedicated terminals via a telephone line. Telephone dial buttons allow a player to input responses. While the game is interactive, real time play is not achieved because of the time required to transmit the volume of data required to generate the screen images. U.S. Pat. No. 4,652,998 discloses a video amusement gaming system using a host and local dedicated machines for playing games, with a prize award pool being provided and awarded depending on allocation of prizes and outcomes of games. Fixed length data packets are transmitted between host and terminals which is inefficient and limit the width of the area of operation and recording of results is limited. With both these systems record storing is minimal and they are not appropriate for wagering.

Generally, while most of such systems as mentioned above concerned with wagering have accounting and auditing/security facilities, these are limited in nature largely because of the volume of data to be stored, the fact that data has to be stored continuously and the problem of errors. For example, to replay an event immediately prior to a fault, one has to store the position of the program being executed, which screens were showing, the state of the memory of the each of the host and each active terminal, and events or inputs leading up to that time of the fault. This is a monumental task, because one can never be sure when a fault is about to occur, and slows operation of each of the computers.

Most known systems thus default to voiding a game in the event of a fault, which is unfair if the fault is beyond the control of the player. On the other hand some system is required to prevent a player from deliberately defeating the outcome of a game.

This invention seeks to provide a casino gaming system capable of interactive, real time, realistic gaming at genuinely remote locations which is economical, secure and reliable. Aspects of the invention seek to minimise telephone line usage and cost and terminal costs; to enable a variety of casino games to be played in such a manner that a player experiences the same "feel", security, etc. as if he were at a casino; and to ensure that faults, deliberate or accidental, in communication and at terminals do not lead to abuse by players or the entity operating the host computer.

Fast, multitasking processing can be achieved by a single, large computer, such as so called "main frame" or "mini" machines. With known technology it is now also possible to achieve the same or even better performance using a local or wide area network of fast, relatively smaller computers each running a multitasking operating system. Technology in this field is increasing exponentially and it is not unrealistic to expect that within a short while a single "personal" computer or so called "application server" could perform substantially the same function as a current main frame. Thus, the terms "host computer" or "host" used herein are to be interpreted broadly to cover machines ranging from a single computer to a plurality of networked computers capable of performing the tasks of playing games; attending to record keeping, accounting, security and communication functions; and servicing a number of players simultaneously.

The term "simulations" as used herein means computer screen graphics, sound or screen graphics and sound that provide visual and optionally audible messages and representations to a player, such as instructions and game simulations.

SUMMARY OF THE INVENTION

The invention provides a gaming system including a host computer, a plurality of terminal computers forming player stations remote from the host, communicating means for connecting each of the terminals to the host, and program means for operating the computers, wherein: each terminal is a general purpose computer having terminal program means for generating simulations for establishing a secure communication with the host, generating simulations to reproduce at least one game and a current player status in response to host control data packets received from the host, generating terminal control data packets, each representative of a valid response at the terminal, and sending such packets to the host; the host has host program means for generating random numbers for a game being played on a connected terminal within preset criteria for that game in response to a data packet received from the terminal, generating host control data packets for controlling the simulations to be reproduced by the connected terminal; and the data packets are of variable length, each of which is dependent on the minimum relevant information required to be transmitted for playing a game.

Preferably, the terminal program includes game data for generating simulations for a plurality of games.

For auditing and security the host preferably has means for sequentially storing accounting data of each player, the random numbers generated by the host, responses received from each player connected to the host, and whether each game has been completed. The stored information is a record of games played and partially played by a player may be used for automatically restoring the statuses of the host and terminal following an interruption in communication between them and/or for replaying on demand at least a portion of at least one game. This ensures fairness for players in the event of a fault, while protecting the operator of the host against players deliberately defeating the outcome of a game, such as by switching off their computers or breaking communication with the host. Minimal storage capacity is required at the host as the stored information corresponds to a sequence of valid player keystroke responses and random numbers generated by the host.

The communicating means preferably comprises modem means on each computer and a telecommunication link. This is general purpose, relatively inexpensive equipment with low operating costs, so that together with the use of general purpose computers players can participate at home or other remote location at little cost. Operating costs for players may be further minimised by using at least one node device connectable, in use, to each of a plurality of terminal computers located within a desired low charge zone and being constructed to route communication between each active terminal and the host. Players thus pay local-call charges only or nothing if they communicate with the host via a toll-free number to the node. The host operator bears minimal costs per player of a high quality link from each node to the host for example, because the costs of the link are amortised over a large number of players. This is important for long distance communication, eg. between cities and/or countries.

The use of small, variable length data packets enables fast and reliable communication between the computers, as the volume of transmitted data is minimised for rapid message transmission. Verification, acknowledgement and re-transmission of data, if needed, will also be extremely quick. A typical response time of under half a second may be expected at the terminal from the time a keystroke is made by a player to the time the terminal screen has been fully updated ready to accept the next player keystroke.

Processing is distributed in what is known in the art as a "client/server" system or application; only essential or relevant data is transmitted between the host and terminals, while each computer processes only those portions of the program means needed to produce a required output, such as a result and account data at the host and simulations at the terminals, and data storage and access is done at a defined location. From this flows the advantage for gaming that processing and transmission are both fast, thereby providing substantial real time operation.

Benefits of using general purpose computers as terminals are low cost for the operator and player; ability to modify, improve or add to the system at little expense using readily available equipment and programs supplied by the host operator; low maintenance and operating costs; and giving each player the freedom to choose the speed and quality of performance he or she desires. Fast processing for the host is easily attainable at relatively low cost, as it has relatively little processing to do for each player since processing of simulations is done at the terminals.

The data packets may be suitably encrypted. Passwords may be used for establishing communication between the host and a terminal and for each player, who may play at any terminal by using his password. Technology for this is well known in the art and any suitable techniques may be used.

A feature of the invention is that the games are interactive, ie. each player selects which game he wishes to play, such as blackjack, video poker, slots, etc., and the host simulates outcomes for that game individually for that player depending on the player's choices during the game. Additionally, program options may be provided for several players to play one game simultaneously against "the house" or one another as desired, such as poker, blackjack, and punto banko, according to casino conventions. Thus, a real life simulation of playing in a casino can be offered to players at home or remote terminals. Additionally non- and partially-interactive games, such as lotteries, bingo, roulette, etc. may also be played with little modification.

Further features, variants, and/or advantages, of the invention will become apparent from the following non-limiting description made with reference to the accompanying schematic drawings of a presently preferred embodiment of the invention.

DESCRIPTION OF PREFERRED EMBODIMENTS

Figure 1:
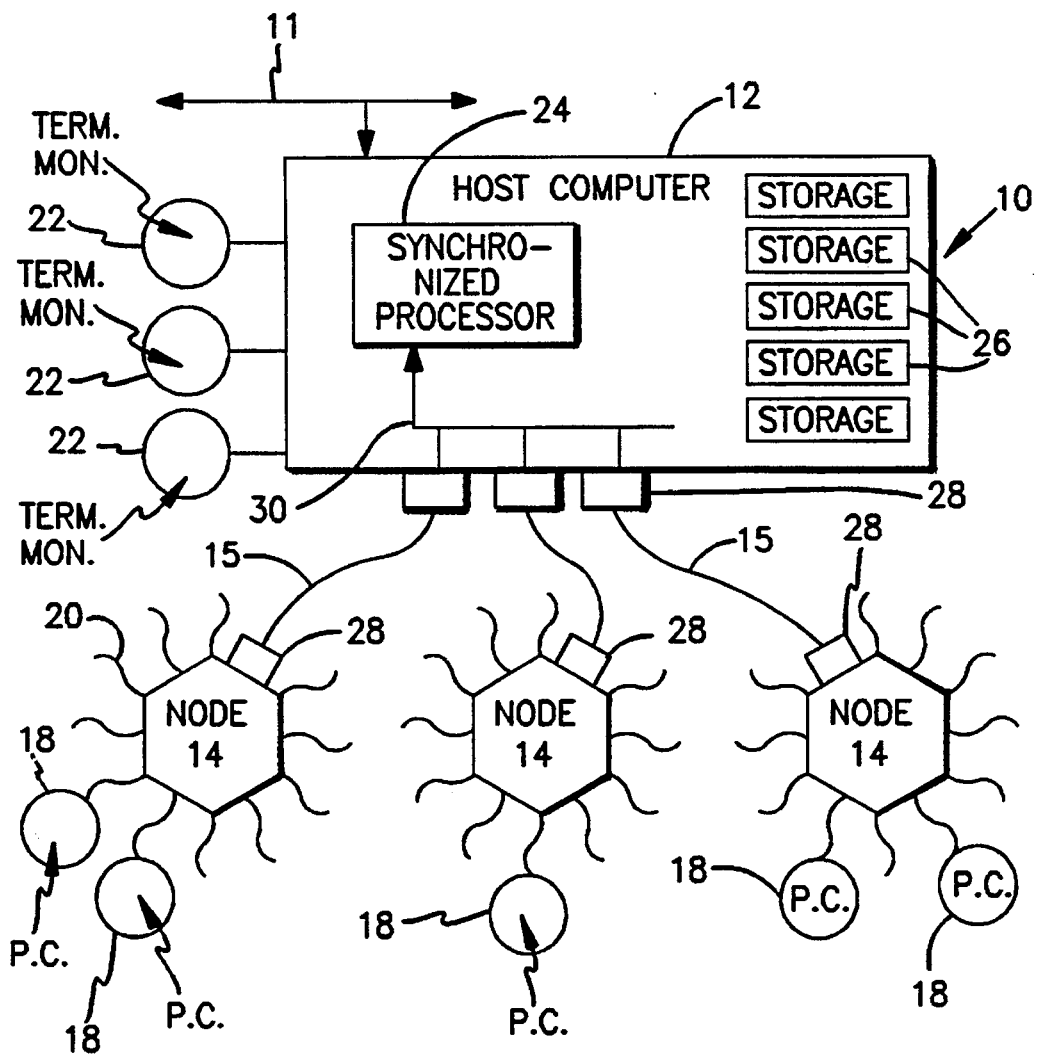
FIG. 1 shows a schematic of a gaming system for playing casino games at terminals located remotely from the casino.
Figure 2:
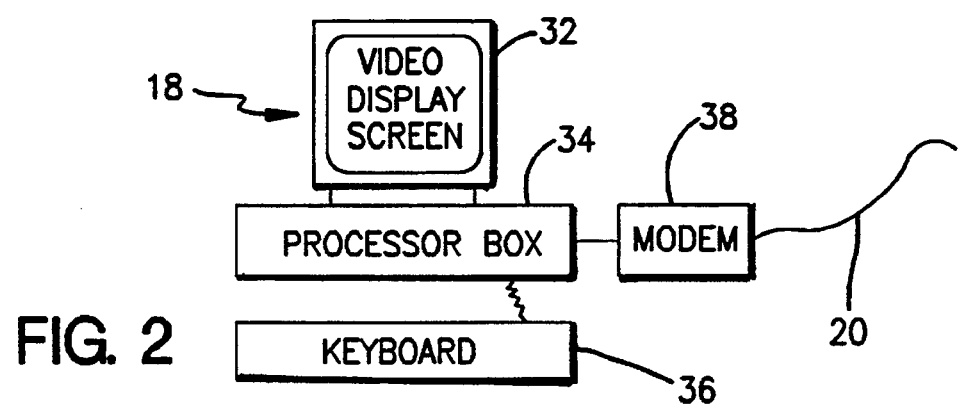
FIG. 2 shows a schematic front view of a player terminal.

In the drawings the same or similar parts are indicated by the same reference numbers.

The drawings show a computerised gaming system 10 for playing casino games comprising a central or host computer 12 at a casino, telecommunication exchanges or nodes 14 connected by lines or paths 16 to the host, and general purpose computers or PC's 18 serving as player terminals connected by telecommunication lines or paths 20 to the nodes 14. Further computer terminal monitors 22 as are located at the host.

The host 12 is a fast, powerful, reliable computer, such as a main frame, mini or application server having one or more synchronised processors 24 and fast, reliable, large capacity data storage devices 26 such as that known in the art as a "RAID disk array". The processor/s run several programs simultaneously to determine outcomes of games of chance according to accepted gaming principles and rules under the control of a master program or operating system. The data storage devices 26 store data bases of player, game and accounting information as well as programs for the host and for downloading to the terminals when required. The host has a number of communication devices or cards 28 connected via a bus 30 to the processor/s and each connected to a line 16. Each device 28 operates bi-directionally to separate and decompress data received in one stream along line 16 into individual streams for each player and compress and compact data into one stream sent out along line 16 to the node 14.

Each PC 18 has a video display screen 32, a box 34 with processor, data disk devices, function cards such as sound cards, etc. as known in the art and not separately illustrated, a keyboard 36, and a modem 38 connected to a line 20. The PC may also have a mouse, not shown.

Each node 14 is a computerised, electronic, switching exchange for selectively connecting each active PC 18 to the line 16 to transmit data between the host and PC. The node is constructed and operated in a known manner to monitor the flow of data between host and PC's to maximise the total information transfer rate and serve each PC as quickly as possible. Thus each node has a communication device 18 functioning as described above to communicate with the host via line 16 and a plurality of modems for communicating with the PC's 18.

Each line 16 is a high quality, dedicated link, such as a high speed line, a fibre optic line or a satellite link, adapted to provide continuous, reliable, high-speed data communication between the host and each node. The lines 20 are public communication links or telephone lines which are energised or established when needed to provide communication between each terminal and the host. The lines 16 provide relatively low cost long distance communication for each terminal because of amortisation of their costs over the large number of terminals they serve. The nodes are located such that the terminals connected to each is within a low cost communication charge zone.

Each PC 18, when used as a terminal for gaming runs a program capable, amongst other things, of generating suitable simulations for a casino game on the display. The same program or several separate program modules may be used for playing a variety of games. The PC does not determine the outcome of any game of chance and thus cannot be considered itself to be a gaming device in the normal sense of the term.

In practice, the system is used as follows.

A person wishing to play a game of chance from a remote PC established an account with a casino or host operator, deposits a opening balance, is allocated a personal password, and is given a gaming software including programs and data for generating screens appropriate to casino games. The gaming program or modifications to it may be downloaded directly from the host via a communications link if required. When the player wishes to play he activates his PC, loads the gaming program, communicates with the casino via the modem and node and "logs in" by supplying his password, which is verified by the host. The host supplies an encryption key code, which is unique for the player and may be unique for the particular communication; the key code is used to code and decipher encrypted data communicated between the PC and host by providing a one-to-one correlation between a set of transmitted characters and a set of program interpretable characters. Communication is now established.

The host then generates and sends a data packet to the PC that is decoded and processed to cause the PC's gaming program to display a game choice screen and the player's account balance. The data packet comprises a start byte, a length byte to indicate the number of sub-packets in this packet, a variable number of sub-packets followed by CRC bytes, i.e, two bytes if CRC 16 is used and four if CRC 32 is used, etc. The sub-packets behave like subroutine arguments to the terminal program. The first 2 bytes define the graphic and sound subroutine to be used and the next 12 bytes the compressed arguments. These bytes can represent 12 ASCII characters or six 2-byte integers or three 4-byte real numbers or a combination of all three for modifying the screen to display the account balance and other information. Multiple sub-packets can be sent in a single packet and multiple packets can be sent until the program running on the host requires input from the player. The last sub-packet is tagged by setting high one of the bits in the 2 bytes defining the subroutine to be called to indicate an end of transmission. The player's terminal acknowledges receipt of each packet by sending an acknowledge byte if the data is good or a negative acknowledge byte if the data is bad and re-transmission is required. The player selects a game to be played using his keyboard or mouse or other input device. A single key is pressed or graphic icon selected and converted to the equivalent keystroke and a data packet of 3 bytes is generated and transmitted. The 3 byte data packet consists of a start byte, a data byte and the one's complement of the data as a check byte. The host acknowledges receipt of the packet if it is received correctly or sends a negative acknowledge requesting re-transmission.

Assuming a card game, such as blackjack, is selected, the host activates: a suitable program module for generating random numbers for blackjack, say 1 to 52 each representing a unique card in a deck of cards; a data base module for evaluating outcomes; and a program module for generating appropriate data packets. The host then generates and transmits a data packet for the PC to reproduce a blackjack simulations on the video display including a request for the player to "place" his bet and a selection of valid keys that correspond to predefined bet values and an audio communication if the PC is capable producing suitable audio effects, such as a voice request to place his bet. The player presses an appropriate key to place his bet and "deal" his cards; this cause the PC's program to generates and transmit a 3 byte data packet to the host. In response, the host, using suitable random number and data base modules and an algorithm to draw unique cards from a deck of cards, "deals" cards for the house and player according to the rules of the game. This information is transmitted as a data packet consisting of 14 byte sub-packets as described above for display to the player. The screen graphics and audio signal simulations are generated by the PC and are not transmitted, thus minimising the volume of transmitted data and maximising the speed of transmission and operation of the game. The player then selects an option, eg. draw, stand, double, split or surrender, by pressing an appropriate key which is sent to the host as a data packet of 3 bytes, processed and the result transmitted for display on the player's PC. This continues until the game is completed at which stage a suitable data packet is generated at the host and transmitted to the PC to display this fact and the new account balance of the player.

The PC's program also evaluates and validates each player input keystroke and transmits only those that are valid. The player may be asked to repeat a keystroke to verify his instructions.

The host stores all significant information needed for auditing, security, accounting, replaying games and restoring the status of the host and PC in the event of a fault or on demand if required. The significant information required is only the account status of the player prior to a game, the significant data contained in each data packet sent to the host and the random numbers generated by the host during the game. The significant data contained in each data packet is only that required for initiating program sequences and excludes pure communication data, e.g. player identification header, control, check and CRC bytes, re-transmissions, etc. Everything relevant to the player and the game can be regenerated from this data. Thus, minimal storage space is required for each game. In this example every player keystroke or graphics icon choice converted to the equivalent keystroke, host generated random number and whether the game is complete or not is stored. In practice, only the last few games need to be stored at any time: if required, data of older games may be flushed or transferred to a back-up storage device to minimise storage capacity requirements. This stored information is used for security and auditing and also to replay or "roll-back" each game to the status prevailing immediately prior to any fault or disruption of communication between the terminal and host.

In this example, the host is programmed automatically to restore the status of the host and the PC when a player re-establishes communication after a disruption or fault. For this, the host first searches its records to establish whether the last game of each player establishing communication was completed. If completed, then the initial game selection sequence is started. If not completed, then the status of the PC and host immediately prior to the fault is restored. Thus, players will not be unfairly treated, eg. if the fault was not caused by them, and players cannot defeat the outcome of a game. This simulates casino gaming conventions or rules.

The data packets transmitted from the PC to the host can be generated from relatively few or single keystrokes. Thus, a data packet from a PC could comprise as little as a single byte or 3 bytes if a header, data, and CRC (cyclic reducing check) or parity information is also transmitted to ensure integrity of transmission. Such data packets can be transmitted and verified very quickly, such as of the order of 2 to 8 milliseconds for a transmission of 1 to 18 bytes and an acknowledgement of 1 byte. More information is required to be transmitted from the casino computer to the terminal and at this stage it is intended that data sub-packets of 14 bytes be used with at most 5 sub-packets being incorporated into a single packet and requiring less than a third of a second to complete the transfer to a terminal using a 2400 baud modem. This enables substantial real-time operation to be achieved as other processing at the host and PC would also be of the order of 2 to 40 milliseconds.

During roll-back the host replays a game using stored player responses and stored previously generated random numbers. In order to display or reproduce this on a terminal it may be necessary to send many data packets to the player's terminal before requiring input from the player. Thus, it is necessary to be able to send multiple data packets from the host to a player's terminal.

It is to be understood that the invention is not limited to the precise constructional details shown in the drawings and described above and modifications may be made thereto as well as will other embodiments become apparent without departing from the spirit of the invention. For example, the sizes of the data packets can be varied as desired. Transmitted data can be further encrypted if desired. Additional nodes may be provided between the nodes 14 and PC's 16 to minimise communication costs even further. The same computers and programs may be used to play roulette, poker, chemin de fer and so on. Several players may play the same game simultaneously, each through his own terminal, either with the host only or with the host and one another, with the host maintaining relative account data in the latter event. These are obvious extensions of the basic concepts disclosed herein.

The host may be a network of computers 10, symbolised in FIG. 1 by a bus or communication link 11 that interconnects the computers in a local or wide area network, each computer being connected to one or more nodes, running a multitasking operating system, and servicing a number of players simultaneously. These computers run the games, generate the required random numbers, and store intermediate auditing and accounting data for each of the players connected to the system at a particular time. These computers are in turn connected to a database engine on the network which stores centralised accounting information. This database engine may itself be a distributed system, but would typically be a single high speed machine incorporating a large disk storage system, such as a RAID disk array with redundancy. The whole host network will also have built in redundancy with backup servers, printers, communication devices, etc. such that in the event of a hardware failure there will be backup that will immediately and automatically take over without loss of information or interruption of service to the players.

I claim:

1. A gaming system including a host computer, a plurality of terminal computers forming player stations remote from the host computer, communicating means for connecting each of the terminal computers to the host computer, and program means for operating the terminal computers, the host computer and the communicating means wherein:

a. each terminal computer has a processor, a video display unit connected to the processor, a data entry means connected to the processor and a terminal communicating means connected to the processor, the communicating means being operable to connect the terminal computer to the host computer via a public telecommunication link;

b. each terminal computer has terminal program means for b1. establishing communication with the host computer and advising the host computer of a personal password of a player using that terminal computer;

b2. generating simulations to reproduce at least one selected game including a player status during playing of the selected game in response to host data packets received from the host computer; and b3. generating terminal data packets, each terminal data packet being representative of a response generated by activating the data entry means at the terminal computer, and sending such packets to the host computer at least each time the data entry means is actuated to generate a valid response; and c. the host computer has host program means for c1. generating at least one random number for the selected game being played on a terminal computer that is in communication with the host computer within preset criteria for that selected game in response to at least one valid terminal data packet received from that terminal computer;

c2. determining a status for the selected game at least when a predetermined number of random numbers have been generated for the selected game, including when the selected game has been completed and an outcome for that selected game;

c3. storing an account for each password and updating the account associated with the password of the player playing on a terminal computer when the selected game is started and when the selected game is completed, the account being updated in accordance with the amount wagered and the outcome determined by the host computer;

c4. verifying the password of the player attempting to establish communication with said host computer via the terminal computer; and c5. generating said host data packets for controlling the simulations to be reproduced by the terminal computer.

2. The gaming system of claim 1, wherein the terminal program means includes game data for generating simulations for a plurality of games and means for generating one of said terminal data packets for identifying each game and sending the data packet to the host computer to control the playing of the game at the host computer.

3. The gaming system of claim 1, wherein for each selected game being played by the player, the host computer has means for storing sequentially: accounting data of the player at the start of each selected game; data representative of each valid response transmitted from the terminal computer to the host computer and each random number generated by the host computer during that selected game; and data representative of whether that selected game was completed.

4. The gaming system of claim 3, wherein replay program means is provided at the host computer for automatically, following an interruption of said selected game, restoring the status of said selected game at the host computer and said player status at the terminal computer that was in communication with the host computer during playing of said selected game and reproducing the simulations that were reproduced on the terminal computer at least at a time during the playing of the selected game when communication between the host computer and the terminal computer was interrupted, said replay program means being initiated when a fresh communication between the host computer and any terminal computer is made using the personal password that was in effect at the time of the interruption, the status of the selected game at the host computer and the player status at the terminal computer being reconstructed from the data stored by the host computer.

5. The gaming system of claim 3, wherein replay program means is provided at the host computer for replaying on demand at least a portion of at least one game from data stored by the host computer.

6. The gaming system of claim 1, wherein the terminal program means includes program means for stripping each received host data packet of data required for transmission purposes only to provide a significant operating instruction and means for processing the significant operating instruction to produce a representative simulation on the terminal computer.

7. The gaming system of claim 1, wherein the communicating means for connecting each of the terminals to the host comprises modem means on each computer and a telecommunication link between the host and each connected terminal.

8. The gaming system of claim 7, wherein the communicating means further includes at least one node device connectable, in use, to each of a plurality of terminal computers located within a desired call charge zone, the node device being connected to the host and being constructed to route communication between each of the terminals and the host.

9. The gaming system of claim 1, wherein, in use during the selected game, the host data packets are less than 80 bytes.

10. The gaming system of claim 1, wherein the host data packets are of variable length, each of which comprises a header, including a start element and a length element indicative of a number of sub-packets to follow, at least one sub-packet of a predetermined number of bytes representative of sub-routine arguments for the terminal program means, and at least one check byte.

11. The gaming system of claim 1, wherein the terminal program means generates and sends a terminal data packet to the host computer each time the data entry means is activated, the host program means having verification means to determine if a received terminal data packet is valid.

12. The gaming system of claim 1, wherein each terminal data packet comprises three bytes and includes a start byte, a data byte and a check byte.

13. The gaming system of claim 1, wherein the terminal program means has password program means to enable a personal password of a player to be entered and transmitted to the host computer when communication with the host computer is being established and the host program means includes password processing means for associating the entered password with stored accounting information relating to that password, whereby a player may play at any terminal computer while communication between that terminal computer and the host computer remains established.

14. A gaming system including a host computer, a plurality of terminal computers forming player stations remote from the host computer, communicating means for connecting each of the terminal computers to the host computer, program means for operating each of the terminal computers and the host computer, and communication program means for establishing communication between each terminal computer and the host computer through the communicating means, wherein:

a. each terminal computer has a processor, a video display unit connected to the processor, a data entry means connected to the processor and a terminal communicating means connected to the processor, the communicating means being operable to connect the terminal computer to the host computer via a public telecommunication link;

b. each terminal computer has terminal program means for b1. enabling a player selectively to establish communication with the host computer via a public communication link between the host computer and terminal computer;

b2. enabling the player to transmit a personal password that has been established previously to the host computer;

b3. generating simulations of at least one selected game including a player status during playing of the selected game in response to host data packets received from the host computer; and b4. generating terminal data packets, each terminal data packet being representative of a response generated by activating the data entry means at the terminal computer, and sending such packets to the host computer at least each time the data entry means is actuated with a valid response; and c. the host computer has host program means for c1. verifying a personal password of a player;

c2. evaluating an account associated with each personal password, a plurality of accounts and associated passwords being stored by data storage means that is independent of each of the terminal computers and that is at least accessible to the host;

c3. generating at least one random number for the selected game being played on a terminal computer that is in communication with the host computer within preset criteria for that selected game in response to at least one terminal data packet received from that terminal computer;

c4. determining a status for the selected game when a predetermined number of random numbers have been generated for the selected game;

c5. updating the account of the player in accordance with the status that has been determined when the selected game has been completed; and c6. generating host data packets for controlling the simulations to be reproduced by the terminal computer.

15. The gaming system of claim 14, wherein the host computer has means for storing sequentially for each selected game being played on a terminal computer that is in communication with the host computer; the personal password of the player; accounting data of the player at the start of each selected game; data representative of each valid response transmitted from the terminal computer to the host computer; each random number generated by the host computer during that selected game; and data representative of whether that selected game was completed.

16. The gaming system of claim 15, wherein replay program means is provided at the host computer for automatically, on establishment of a fresh communication between a terminal computer and the host computer and verification of a personal password of a player following interruption of an original communication between the host computer and a terminal computer before a selected game has been completed, restoring the status of the selected game at host computer and the player status at terminal computer that was originally in communication with the host computer when the original communication was interrupted and reproducing the simulations that were reproduced on the terminal computer from the start of the selected game that was being played until the communication was interrupted, the status of the host computer and the simulations of the selected game on the terminal computer prior to the interruption being reconstructed from data stored by the host computer and retrieved on verification of the personal password and determination that the selected game had not been completed.

17. The gaming system of claim 14, wherein the status of the account associated with a password is independent of any information transmitted to the host computer from a terminal computer when the terminal computer is in communication with the host computer for the purpose of playing a game other than the value of a wager placed at the start of the game.

\* \* \* \* \*